US009380532B2

(12) United States Patent
Xu (10) Patent No.: US 9,380,532 B2
(45) Date of Patent: Jun. 28, 2016

(54) USER EQUIPMENT AND PAGING METHOD AND SYSTEM USING AN EXTENDED PAGING PERIOD

(71) Applicant: ZTE CORPORATION, Shenzhen, Guangdong Province (CN)

(72) Inventor: Hui Xu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/650,628

(22) PCT Filed: Aug. 13, 2013

(86) PCT No.: PCT/CN2013/081338
§ 371 (c)(1),
(2) Date: Jul. 7, 2015

(87) PCT Pub. No.: WO2014/089985
PCT Pub. Date: Jun. 19, 2014

(65) Prior Publication Data
US 2015/0327215 A1 Nov. 12, 2015

(30) Foreign Application Priority Data

Dec. 10, 2012 (CN) .......................... 2012 1 0527648

(51) Int. Cl.
*H04W 4/00* (2009.01)
*H04W 52/02* (2009.01)
*H04W 68/02* (2009.01)
*H04W 60/04* (2009.01)
*H04W 68/00* (2009.01)
*H04W 76/04* (2009.01)

(52) U.S. Cl.
CPC .......... *H04W 52/0216* (2013.01); *H04W 60/04* (2013.01); *H04W 68/005* (2013.01); *H04W 68/02* (2013.01); *H04W 76/04* (2013.01); *H04W 76/048* (2013.01); *Y02B 60/50* (2013.01)

(58) Field of Classification Search
CPC ............................. H04W 68/02; H04W 76/04
USPC ...................................................... 455/435.1
See application file for complete search history.

(56) References Cited

U.S. PATENT DOCUMENTS

2005/0148348 A1 7/2005 Cramby et al.
2010/0130237 A1 5/2010 Kitazoe et al.
(Continued)

FOREIGN PATENT DOCUMENTS

CN 102217408 A 10/2011
CN 102740422 A 10/2012
CN 102763347 A 10/2012

*Primary Examiner* — Don N Vo
(74) *Attorney, Agent, or Firm* — Ling Wu; Stephen Yang; Ling and Yang Intellectual Property (57) ABSTRACT

Disclosed are a user equipment and a method and a system using an extended paging period to page. In the method, the MME/SGSN negotiates with a UE to obtain a first extended paging period; the MME/SGSN sends the first extended paging period and paging indication information which indicates to use the first extended paging period to page to a radio access network; the radio access network sends the first extended paging period in the system information and uses the first extended paging period to send a paging message; the UE selects a second extended paging period according to an extended paging period needed by the UE itself and the first extended paging period, and monitors the paging message according to the second extended paging period. The embodiment of the present application enables a UE in an idle mode to achieve an energy-saving effect by using the extended paging period.

20 Claims, 5 Drawing Sheets

(56) References Cited

U.S. PATENT DOCUMENTS

| | | | |
|---|---|---|---|
| 2011/0222457 A1* | 9/2011 | Lee | H04W 28/06 370/312 |
| 2012/0201401 A1* | 8/2012 | Kim | H04R 29/004 381/122 |
| 2012/0281543 A1* | 11/2012 | Xue | H04W 68/02 370/241 |
| 2012/0297223 A1* | 11/2012 | Wu | H04W 52/0212 713/320 |
| 2012/0300685 A1 | 11/2012 | Kim et al. | |
| 2015/0043455 A1* | 2/2015 | Miklos | H04W 8/26 370/329 |

\* cited by examiner

USER EQUIPMENT AND PAGING METHOD AND SYSTEM USING AN EXTENDED PAGING PERIOD

TECHNICAL FIELD

The present document relates to the technology of using an extended paging period to page, and more particularly, to a user equipment, and a paging method and system using an extended paging period to page.

BACKGROUND OF THE RELATED ART

Machine-to-Machine (M2M) communication refers to all communication technologies and ways that establish a connection between the machines. The concept of M2M communication is currently the focus of many communication equipment manufacturers and telecom operators. Currently the number of machines all around the world is a lot more than the number of people, so it can be anticipated that there is a huge demand on the M2M technology.

Researches on M2M communication application scenarios indicate that providing the M2M communication on a mobile network has a potential market prospect. Existing mobile communication networks are mainly designed for human-to-human communication, and are less optimized for machine-to-machine and man-to-machine communications. Moreover, how the operators provide the M2M communication service at a low cost is a key of a success of M2M communication deployment. For a variety of new requirements of the M2M service on the system, in order to enhance the mobile network's competitiveness in this area, it is necessary to optimize the existing mobile networks to more efficiently support the M2M communication.

Based on the above condition, it is necessary to study solutions for the mobile network supporting the M2M communication, and the solutions should maximize reuse of the existing networks to reduce the impact of a large number of M2M communications on the network as well as the complexity of operation and maintenance for the network.

In order to effectively utilize mobile network resources, the 3rd Generation Partnership Project (3GPP) proposed Machine Type Communication (MTC), namely as Machine to Machine and Machine to Man, to communicate, its service scope is far beyond previous Human to Human (H2H) communication. The MTC is very different from the existing H2H communication mode in access control, charging, security, Quality of Service (QoS), service mode, and other aspects.

Figure 1:
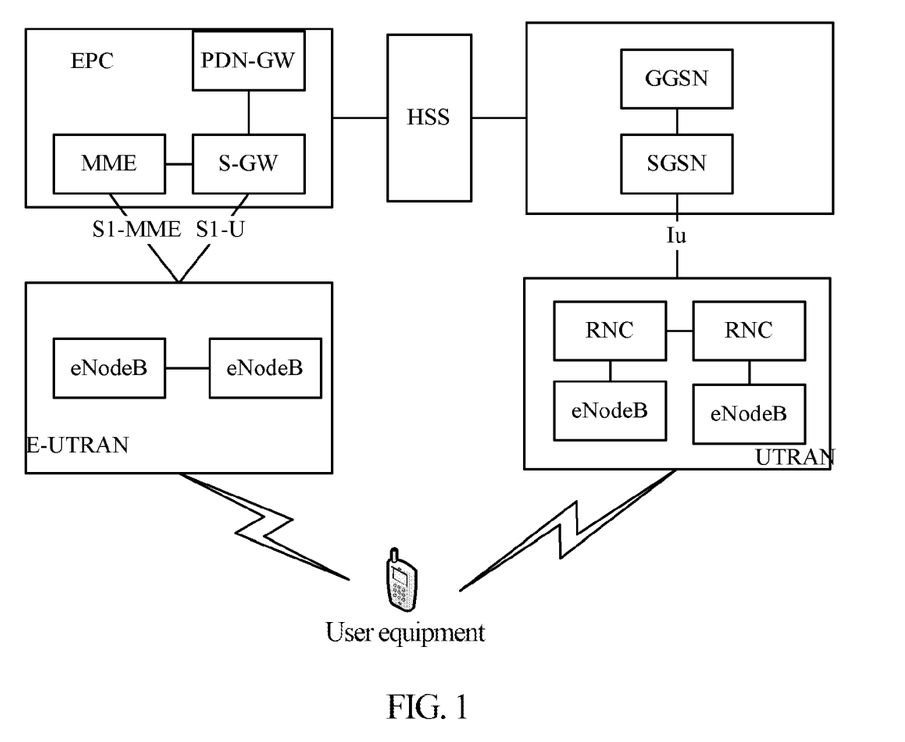
FIG. 1 is a schematic diagram of the architecture of the 3GPP mobile communication network.

FIG. 1 is a schematic diagram of the architecture of the 3GPP mobile communication network. As shown in FIG. 1, a radio access network (such as Universal Terrestrial Radio Access Network (UTRAN), evolved UTRAN (E-UTRAN)) and a core network, for example, an Evolved Packet Core network (EPC) is provided with network elements such as Mobility Management Entity (MME), serving gateway, and Public Data Network gateway (PDN Gateway), a General Packet Radio Service (GPRS) core network comprises network elements such as the Serving GPRS Support Node (SGSN); the E-UTRAN comprises an evolved Node B (eNB); wherein the E-UTRAN is connected with the MME/S-GW in the EPC via an S1 interface, and the UTRAN is connected with the SGSN via an Iu interface.

The purpose of paging is to indicate a called information request or a system information change to a target User Equipment (UE), the target UE which receives a paging message establishes a connection with network side or reads the changed system information according to an indication of the paging message. Paging scope is generally a registered area of the UE, and a page is generally sent at a particular time point, and the particular time point is obtained by a UE Identity and paging period calculation, so that each UE has a corresponding paging time point. No matter in an idle state or a connected state, the UE monitors the page in its own paging time point. A paging process is initiated by the MME/SGSN at the network side, and sent to the paging area where the target UE is located through the E-UTRAN/UTRAN, and the target UE receives the corresponding paging message at the paging time point.

For a battery-powered MTC UE, it needs to take measures to reduce power consumption of the UE. For a power supply powered MTC UE, it also needs to reduce power consumption of the UE to achieve a goal of green energy-saving.

Currently, smart phones gradually become popular, and a large number of applications are running on the smart phones. These applications may result in increased battery power consumption of the smart phones, thereby battery life is shortened. Therefore power saving of the smart phones is also a key issue to be addressed urgently.

Discontinuous Reception (DRX) is a technique which reduces the power consumption of the UE, the UE in a DRX sleeping state shuts down most of receiving and sending circuits to achieve the power-saving purpose. The DRX can be used in a radio resource control connected (RRC Connected, hereinafter referred to as connected) mode and a radio resource control idle (RRC Idle, hereinafter referred to as idle) mode, wherein the DRX in the idle mode is a paging DRX.

To further reduce power consumption of the UE, an existing research proposes a scheme using an extended DRX period, for example, the extended DRX paging period is used to reduce the power consumption of the UE in the idle mode.

In the process of researching and practicing the related art, the prior art is found to have following problems:

currently the UE selects a minimum value according to an upper layer indication and the paging period of system information broadcast when determining the paging period. Therefore, even though the MME/SGSN at the network side uses the extended paging period, the UE still uses the relatively short default paging period in system information, thus the meaning of using the extended DRX paging period is lost.

SUMMARY

To solve the technical problem, the embodiments of the present document are to overcome a defect that there is a waste of User Equipment (UE) power because currently a target UE still uses a relatively short default paging period in system information when an MME/SGSN at network side uses an extended paging period.

To solve the above-mentioned technical problem, the following technical scheme is used:

the present document provides a method of using an extended paging period to page, comprising:

a Mobility Management Entity (MME) or a Serving General Packet Radio Service (GPRS) Support Node (SGSN) negotiating an extended paging period with a User Equipment (UE) to obtain a first extended paging period;

the MME/SGSN sending the first extended paging period and paging indication information which indicates to use the first extended paging period to page to a radio access network;

after receiving the first extended paging period and the paging indication information, the radio access network sending the first extended paging period in system information, and using the first extended paging period to send a paging message;

the UE selecting a second extended paging period according to an extended paging period needed by the UE itself and the first extended paging period, and monitoring the paging message according to the second extended paging period.

Alternatively, an MME/SGSN negotiating an extended paging period with a UE to obtain a first extended paging period, comprises:

the UE sending a request message which indicates requesting to use a certain extended paging period supported by the UE itself to the MME/SGSN;

the MME/SGSN judging whether to accept the requested extended paging period according to subscription information of the UE and a local policy after receiving the request message;

the MME/SGSN taking the requested extended paging period as the first extended paging period, otherwise, selecting an extended paging period in local as the first extended paging period, when accepting the requested extended paging period;

the MME/SGSN sending a negotiation response indication message of accepting or rejecting the requested extended paging period to the UE.

Alternatively, the UE sending a request message which indicates requesting to use a certain extended paging period supported by the UE itself to the MME/SGSN, comprises: the UE sending the request message to the MME/SGSN according to an attach request message, a Tracking/Routing Area Update (TAU/RAU) message or a service request message.

Alternatively, the MME/SGSN selecting an extended paging period in local as the first extended paging period, comprises: the MME/SGSN selecting an extended paging period which is shorter than the extended paging period that the UE requests to use in local according to the local policy and the subscription information of the UE as the first extended paging period.

Alternatively, the MME/SGSN sending a negotiation response indication message of accepting or rejecting the requested extended paging period to the UE comprises: the MME/SGSN sending the negotiation response indication message to the UE via Non-Access Stratum (NAS) signaling.

Alternatively, an MME/SGSN negotiates an extended paging period with a UE to obtain a first extended paging period, comprises: the UE sending capability information for indicating that the UE itself supports an extended paging periods to the MME/SGSN; the MME/SGSN selecting an extended paging period for the UE in local as the first extended paging period according to the capability information after receiving the capability information.

Alternatively, an MME/SGSN negotiates an extended paging period with a UE to obtain a first extended paging period, comprises:

the MME/SGSN selecting a certain extended paging period according to the subscription information of the UE, Quality of Service (QoS) of the application, and the local policy;

the MME/SGSN sending the selected certain extended paging period to the UE;

the UE judging whether the UE can support the certain extended paging period according to application requirements and the capability of the UE itself supporting an extended paging period;

when the UE can support the certain extended paging period, the UE sending a negotiation response indication message of accepting the certain extended paging period to the MME/SGSN; when the UE cannot support the certain extended paging period, the UE sending a negotiation response indication message of rejecting the certain extended paging period to the MME/SGSN;

the MME/SGSN determining the first extended paging period according to the negotiation response indication message.

Alternatively, the MME/SGSN sending the selected certain extended paging period to the UE, comprises: the MME/SGSN sending the selected certain extended paging period to the UE via the Non-Access Stratum (NAS) signaling.

Alternatively, the NAS signaling comprises an attach accepted message or a Tracking/Routing Area Update (TAU/RAU) accepted message.

Alternatively, the UE sending a negotiation response indication message of accepting or rejecting the certain extended paging period to the MME/SGSN, comprises: the UE sending the negotiation response indication message to the MME/SGSN through the Non-Access Stratum (NAS) signaling.

Alternatively, the MME/SGSN determining the first extended paging period according to the negotiation response indication message, comprises:

when the UE sends the negotiation response indication message of accepting the certain extended paging period to the MME/SGSN, the MME/SGSN determining the certain extended paging period as the first extended paging period;

when the UE sends the negotiation response indication message of rejecting the certain extended paging period to the MME/SGSN, the MME/SGSN determining a certain extended paging period supported by the UE which is carried in the negotiation response indication message of rejecting the certain extended paging period sent by the UE as the first extended paging period.

Alternatively, the MME/SGSN sending the first extended paging period and paging indication information which indicates to use the first extended paging period to page to a radio access network, comprises: the MME/SGSN sending the first extended paging period and the paging indication information to the radio access network via a paging message.

Alternatively, the MME/SGSN sending the first extended paging period and the paging indication information which indicates to use the first extended paging period to page to a radio access network, comprises: the SGSN sending the first extended paging period and the paging indication information to a Universal Terrestrial Radio Access Network (UTRAN) via an Iu interface; the MME sending the first extended paging period and the paging indication information to an evolved UTRAN (E-UTRAN) via an S1 interface.

Alternatively, the UTRAN comprises a Radio Network Controller (RNC) and a Node B (NodeB), or the RNC and an Evolved Node B (eNodeB);

the E-UTRAN comprises an eNodeB.

Alternatively, the radio access network sending the first extended paging period in system information and using the first extended paging period to send a paging message, comprises: the radio access network calculating a paging time point according to the first extended paging period and an identity of the UE, and sending the paging message at the calculated paging time point.

Alternatively, the UE selecting a second extended paging period according to an extended paging period needed by the UE itself and the first extended paging period, comprises: the UE selecting a minimum extended paging period from the extended paging period which is requested from to the MME/SGSN to be used and the first extended paging period as the second extended paging period.

Alternatively, the UE selecting a second extended paging period according to an extended paging period needed by the UE itself and the first extended paging period, comprises: the UE calculating the paging time point according to the second extended paging period and the identity of the UE itself, and monitoring the paging message at the calculated paging time point.

Alternatively, the UE selecting a second extended paging period according to an extended paging period needed by the UE itself and the first extended paging period, comprises: the UE monitoring the paging message for once or more times in active time of a Discontinuous Reception (DRX) paging period; when the UE monitors the paging message for several times in the active time of the DRX paging period, the radio access network sending the paging message for several times in the active time.

The embodiment of the present application discloses a User Equipment (UE), comprising:

a first device, used for sending a request message which indicates requesting to use a certain extended paging period supported by the UE itself or capability information for indicating that the UE itself supports an extended paging period to a Mobility Management Entity (MME) or a Serving General Packet Radio Service (GPRS) Support Node (SGSN), or used sending a negotiation response indication message of accepting the certain extended paging period to the MME/SGSN when the UE can support the certain extended paging period, and sending a negotiation response indication message of rejecting the certain extended paging period to the MME/SGSN when the UE cannot support the certain extended paging period;

a second device, used for receiving the negotiation response indication message of accepting or rejecting the requested extended paging period sent by the MME/SGSN, receiving a first extended paging period sent by a radio access network in system information and a paging message sent with the first extended paging period, selecting a second extended paging period according to an extended paging period needed by the UE itself and the first extended paging period and monitoring a paging message according to the second extended paging period; or used for receiving a certain extended paging period sent by the MME/SGSN and the first extended paging period determined and sent by the MME/SGSN according to the negotiation response indication message, receiving a first extended paging period sent by the radio access network in the system information and paging message sent with the first extended paging period, selecting a second extended paging period according to an extended paging period needed by the UE itself and the first extended paging period and monitoring the paging message according to the second extended paging period.

Alternatively, the first device is configured to send the request message to the MME/SGSN through an attach request message, a Tracking/Routing Area Update request message (TAU/RAU) or a service request message.

Alternatively, the second device is configured to receive the negotiation response indication message sent by the MME/SGSN via Non-Access Stratum (NAS) signaling.

Alternatively, the second device is configured to receive the certain extended paging period sent by the MME/SGSN through the Non-Access Stratum (NAS) signaling.

Alternatively, the first device is configured to send the negotiation response indication message to the MME/SGSN through the Non-Access Stratum (NAS) signaling.

Alternatively, the second device is configured to select a minimum extended paging period from the extended paging period which is requested from the MME/SGSN to be used and the first extended paging period as the second extended paging period.

Alternatively, the second device is configured to calculate a paging time point according to the second extended paging period and an identity of UE itself, and monitor the paging message at the paging time point calculated by the second device.

Alternatively, the second device is configured to monitor the paging message for once or more times in an active time of a Discontinuous Reception (DRX) paging period; when the second device is configured to, monitor the paging message for several times in the active time of the DRX paging period, the radio access network sends the paging message for several times in the active time.

The embodiment of the present application further provides a system of using an extended paging period to page, comprising:

a Mobility Management Entity (MME) or Serving General Packet Radio Service (GPRS) Support Node (SGSN), configured to negotiate an extended paging period with a User Equipment (UE) to obtain a first extended paging period, send the first extended paging period and paging indication information which indicates to use the first extended paging period to page to a radio access network;

the radio access network is configured to, after receiving the first extended paging period and the paging indication information, send the first extended paging period in system information and use the first extended paging period to send a paging message;

the UE is configured to select a second extended paging period according to an extended paging period needed by the UE itself and the first extended paging period, and monitor the paging message according to the second extended paging period.

Alternatively, the radio access network comprises a Radio Network Controller (RNC) and a Node B (NodeB), or comprises an RNC and an Evolved Node B (eNodeB), or comprises an eNodeB.

Alternatively, the UE comprises a Machine Type Communication (MTC) apparatus or an intelligent terminal.

Compared with the related art, the embodiments of the present application enable a UE in the idle mode to achieve the energy saving effect by using the extended paging period. In the embodiments of the present application, when the MME/SGSN at the network side uses the extended DRX paging period, the E-UTRAN/UTRAN uses the extended paging period, and the target UE also selects the extended paging period to monitor the paging message. The embodiments of the present application enable the extended paging period to achieve its proper meaning, thereby to reduce the power consumption of the target UE, extend the life of a power supply unit such as the battery, and have the advantages of energy-saving and environmental protection.

Other features and advantages of the present document will be set forth in the following specification, and in part will be obvious from the specification, or can be learned by practicing the present document. The objectives and other advantages of the present document may be achieved and obtained through the structure particularly pointed out in the specification, the claims and the accompanying drawings.

BRIEF DESCRIPTION OF THE DRAWINGS

The accompanying drawings are used to provide a further understanding of the technical solution of the present document and constitute a part of the specification, and serve to explain the technical scheme of the present document together with the embodiments of the present application, and also are not construed as limiting the technical scheme of the present document.

PREFERRED EMBODIMENTS OF THE INVENTION

Hereinafter, in conjunction with the accompanying drawings and the embodiments, the implementation of the present document will be described in detail, so as to fully understand and accordingly implement the implementation process of how the present document uses technical means to solve the technical problem and to achieve the technical effect. Combinations of the embodiments of the present application and various features in the embodiments are within the protection scope of the present document on the premise of no conflict.

In addition, steps illustrated in the flow charts in the accompanying drawings can be performed in a computer system having a set of computer-executable commands. Furthermore, although a logical order is shown in the flow charts, in some cases, the steps described or illustrated herein may be performed in a different order.

Figure 2:
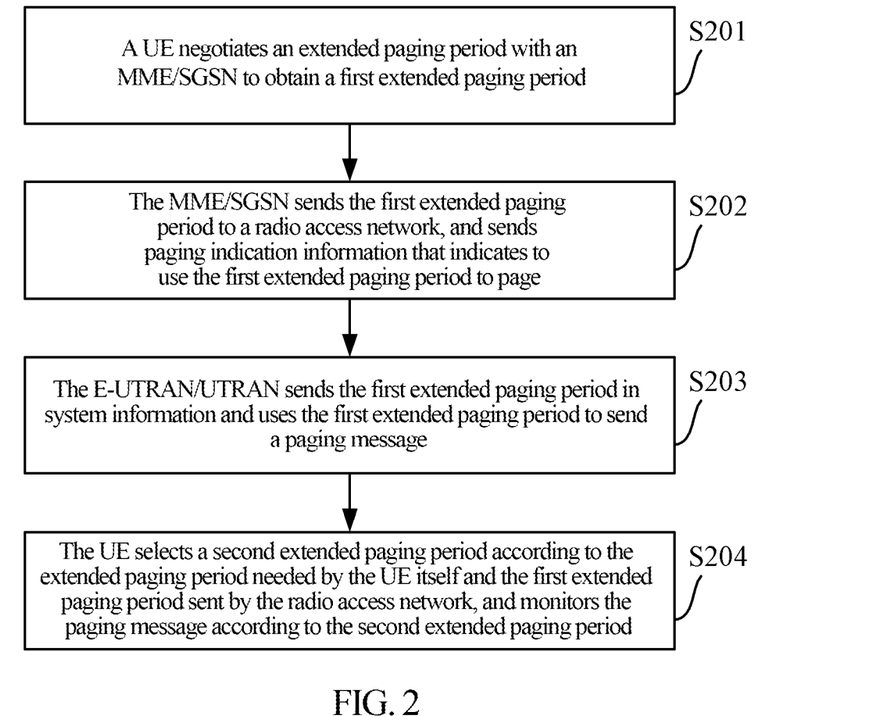
FIG. 2 is a schematic diagram of a flow chart of a paging method using an extended paging period in accordance with an embodiment of the present application.

As shown in FIG. 2, a method of using the extended paging period to page according to the embodiment of the present application mainly comprises the following steps:

In step S201, the UE negotiates the extended paging period with an MME/SGSN to obtain a first extended paging period.

In the embodiment of the present application, this negotiation process, for example, can be that the UE sends capability information for indicating that the UE itself supports the extended paging period to the MME/SGSN, and the MME/SGSN selects an extended paging period for the UE in local as the first extended paging period according to the capability information after receiving the capability information.

It should be noted that, unless otherwise stated, the paging period and the DRX paging period in the embodiment of the present application are the same concept.

In step S202, the MME/SGSN sends a first extended paging period to a radio access network (such as E-UTRAN/UTRAN), and sends paging indication information that indicates to use the first extended paging period to page.

In the embodiment of the present application, the MME/SGSN sends a message (such as paging message) including the first extended paging period to the E-UTRAN/UTRAN through an S1/Iu interface.

In step S203, the E-UTRAN/UTRAN sends the first extended paging period in system information and uses the first extended paging period to send the paging message after receiving the first extended paging period and the paging indication information.

In the embodiment of the present application, the E-UTRAN/UTRAN indicates the received first extended paging period in the system information according to the received information and uses the first extended paging period to send the paging message.

In the embodiment of the present application, the E-UTRAN/UTRAN does not indicate a default paging period in the system information any more, meanwhile the E-UTRAN/UTRAN calculates a paging time point according to the first extended paging period and a an identity of the UE, and sends the paging message at the calculated paging time point.

In step S204, the UE selects a second extended paging period according to the extended paging period needed by the UE itself and the first extended paging period sent by the radio access network, and monitors the paging message according to the selected second extended paging period.

In the embodiment of the present application, the UE may calculate at least one paging time point according to the selected second extended paging period, and monitor the paging message at the calculated at least one paging time point. It should be noted that: the UE can monitor the paging message for once or more times within the second extended paging period, wherein the purpose of monitoring the paging message for several times is to receive the paging message correctly, the UE monitors the paging message for several times in active time in the second extended paging period which requires the E-UTRAN/UTRAN send the paging message for several times at this point. It should be noted that: the embodiment of the present application takes the DRX as an example to describe, but does not exclude the use of discontinuous transmission (DTX), in fact, the embodiment of the present application is equally applicable to the DTX.

In the embodiment of the present application, the E-UTRAN may be an Evolved Node B (eNodeB), the UTRAN may be a Radio Network Controller (RNC), an eNodeB/NodeB, and so on.

In the embodiment of the present application, the UE may be an MTC apparatus or an intelligent terminal. Wherein the MTC apparatus refers to a UE having MTC function, and the intelligent terminal can be a smart phone, a panel computer, an Internet access card or a netbook.

Figure 3:
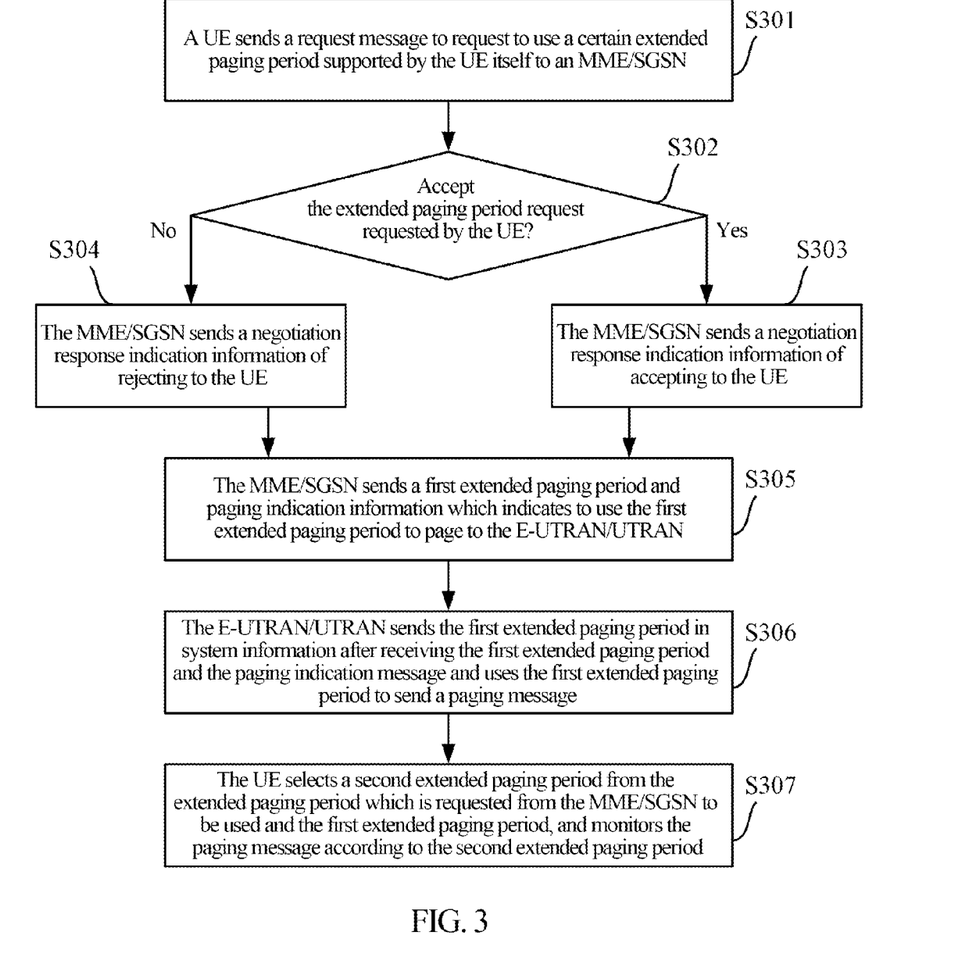
FIG. 3 is a schematic diagram of a flow chart of a paging method using an extended DRX paging period in accordance with an embodiment of the present document.

As shown in FIG. 3, the present example aims at the scenario of the UE requesting an extended paging period. The present example mainly comprises the following steps:

In step S301, the UE sends a request message which indicates requesting to use a certain extended paging period supported by the UE itself to an MME/SGSN.

In the embodiment of the present application, the UE may be a MTC UE or an intelligent terminal.

In the embodiment of the present application, the UE actively sends a request message to the MME/SGSN or the user sends a request message to the MME/SGSN by operating the UE.

In the embodiment of the present application, the UE sends the request message through the Non-Access Stratum (NAS) signaling. The request message can be any of the following messages: an attach request message, a Tracking/Routing Area Update request (TAU/RAU) message and a service request message.

In the embodiment of the present application, the UE selects a value of the extended paging period according to application requirements, the capability of the UE supporting the extended paging period, and other information.

In the embodiment of the present application, the UE explicitly or implicitly sends the request message to the MME/SGSN. The explicitly sending refers to that the UE uses an extended paging period capability bit (EP) in the NAS signaling to indicate whether the UE support the extended paging period, EP=1 indicates that the UE supports the extended paging period, EP=0 indicates that the UE does not support, sending the EP indicates that the UE supports the extended paging period, sending the EP (no matter 1 or 0) indicates that the UE does not support, etc. The implicitly sending refers to that the UE carries the supported extended paging period in the NAS signaling, and the MME/SGSN received the extended paging period determines that the UE has a supporting capability.

In step S302, the MME/SGSN judges whether to accept the extended paging period request requested by the UE after receiving the request message, if yes, then it is to proceed to step S303, otherwise it is to proceed to step S304.

In the embodiment of the present application, the MME/SGSN judges whether to accept the UE's request according to subscription information of the UE and a local policy, for example, if the subscription information of the UE does not support the requested extended paging period, and/or the MME/SGSN does not support the extended paging period, the MME/SGSN rejects the extended paging period requested by the UE.

In step S303, the MME/SGSN sends negotiation response indication information of accepting the extended paging period request to the UE.

the MME/SGSN takes the requested extended paging period as the first extended paging period when accepting the extended paging period requested by the UE, and it is to proceed to step S305.

In the embodiment of the present application, the MME/SGSN sends the negotiation response indication information to the UE through the NAS signaling.

In step S304, the MME/SGSN sends a negotiation response indication message of rejecting the requested extended paging period to the UE, and it is top proceed to step S305.

In the embodiment of the present application, if the MME/SGSN does not accept the extended paging period requested by the UE, then the MME/SGSN may not send an indication message to the UE or send the above-mentioned negotiation response indication message of rejection to the UE. If the MME/SGSN sends the negotiation response indication information of rejecting the extended paging period requested by UE to the UE, the MME/SGSN sends the information to the UE through the NAS signaling.

In step S305, the MME/SGSN sends the E-UTRAN/UTRAN the first extended paging period and the paging indication information which indicates to use the first extended paging period to page.

In the embodiment of the present application, if the MME/SGSN accepts the extended paging period requested by the UE, the MME/SGSN sends the extended paging period requested by the UE to the E-UTRAN/UTRAN, otherwise, the MME/SGSN sends the extended paging period selected and determined in local.

It should be noted that: when the MME/SGSN selects and determines the expanded paging period in local, the MME/SGSN selects an extended paging period which is shorter than the extended paging period requested by the UE in local as the above-mentioned first extended paging period according to the local policy and the subscription information the UE.

In the embodiment of the present application, the first extended paging period and the paging indication information may be sent via the paging message, wherein the indication information is a newly added information element which explicitly indicates to use the extended paging period to page.

In the embodiment of the present application, the MME sends the first extended paging period and the paging indication information to the E-UTRAN via an S1 interface, and the SGSN sends the first extended paging period and the paging indication information to the UTRAN via an Iu interface.

In step S306, the E-UTRAN/UTRAN sends the first extended paging period in the system information after receiving the first extended paging period and the paging indication information, and uses the first extended paging period to send the paging message.

In the embodiment of the present application, the E-UTRAN comprises an eNodeB (referred to as eNB), the UTRAN comprises: an RNC and an eNB/NodeB.

In the embodiment of the present application, the E-UTRAN/UTRAN calculates a paging time point according to the first extended paging period and the identity of the UE, and sends the paging message at the corresponding paging time point.

In the embodiment of the present application, the E-UTRAN/UTRAN does not comprise the default paging period in the system information.

In step S307, the UE selects the minimum extended paging period from the extended paging period which is requested from the MME/SGSN to be used and the first extended paging period as the second extended paging period, and monitors the paging message according to the selected second extended paging period.

In the embodiment of the present application, the UE calculates the paging time point according to the selected second extended paging period and its own identity, and monitors the paging message at the calculated paging time point. Taking into account that the paging time points of different UEs may be the same, thereby it may result in a paging conflict, that is, the UE can not correctly receive the required paging message. To ensure to receive the paging message correctly, the UE monitors the paging message for once or more times within the active time of a DRX paging period. If the UE monitors the paging message for several times within the active time, correspondingly the E-UTRAN/UTRAN sends the paging message for several times within the active time.

Figure 4:
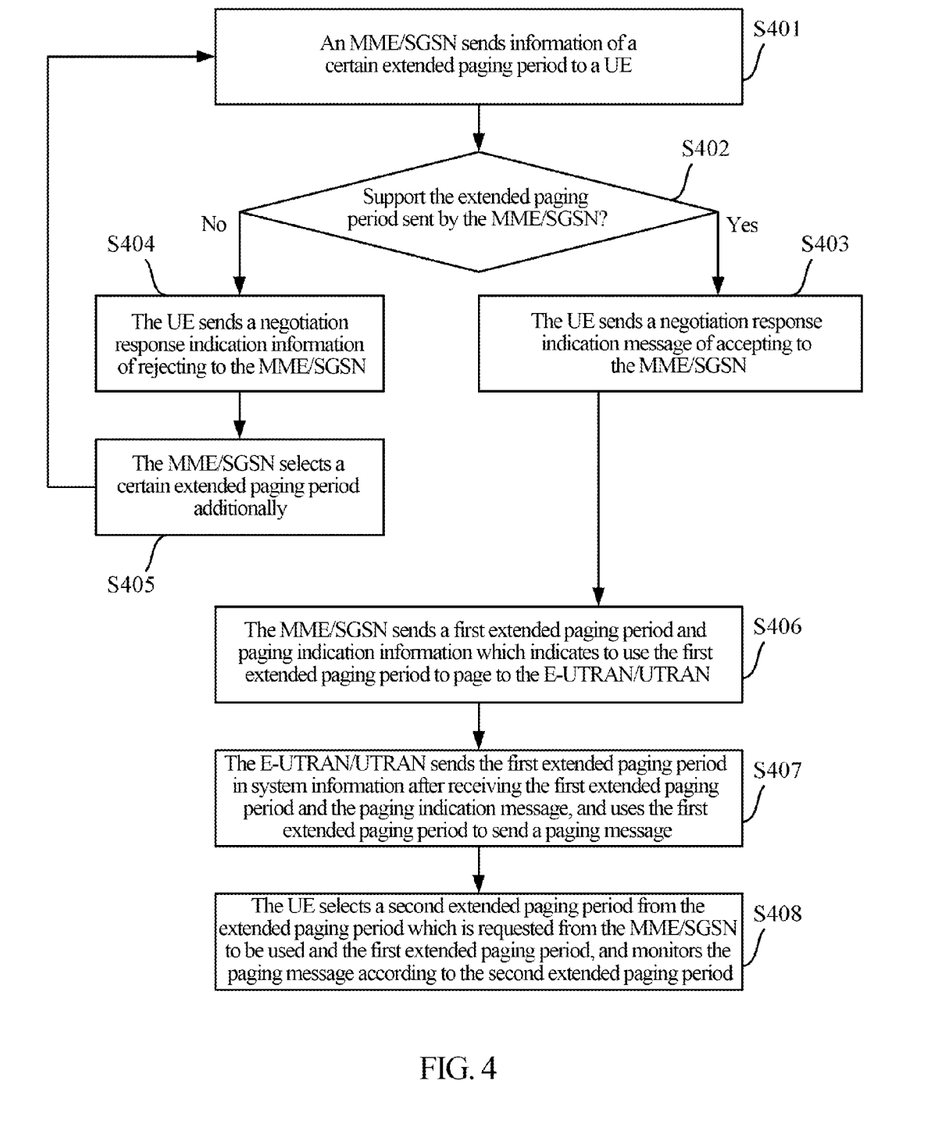
FIG. 4 is a schematic diagram of a flow chart of another paging method using the extended DRX paging period in accordance with an embodiment of the present document.

As shown in FIG. 4, the example is aiming at a scenario in which an MME/SGSN sends an extended paging period. The method of the present example mainly comprises the following steps:

In step S401, the MME/SGSN sends information of a certain extended paging period to a UE.

In the embodiment of the present application, the MME/SGSN selects the extended paging period according to the UE subscription information, Quality of Service (QoS) of the application, and a local policy, and sends the extended paging period which is selected to the UE.

In the embodiment of the present application, the MME/SGSN can send the extended paging period information through any of the following NAS signaling: an attach accepted message and a Tracking/Routing Area Update (TAU/RAU) accepted message.

In step S402, the UE judges whether to support the extended paging period sent by the MME/SGSN, and if yes, it is to proceed to step S403, otherwise it is to proceed to step S404.

In the embodiment of the present application, the UE judges whether to support the extended paging period sent by the MME/SGSN according to the application needs and the capability of UE itself supporting the extended paging period.

For example, the QoS applied on the UE does not support the extended paging period sent by the MME/SGSN, or the capability of the UE itself does not support the extended paging period sent by the MME/SGSN, the UE may reject to accept the extended paging period sent by the MME/SGSN.

In step S403, the UE sends the MME/SGSN a negotiation response indication information of accepting a certain extended paging period, and it is to proceed to step S406.

In the embodiment of the present application, the UE sends a negotiation response indication information of accepting the extended paging period to the MME/SGSN through the NAS signaling.

In step S404, the UE sends a negotiation response indication message of rejecting the extended paging period to the MME/SGSN, and it is to proceed to step S405.

In the embodiment of the present application, the UE sends the negotiation response indication message of rejecting the certain extended paging period, and also simultaneously sends reasons for rejection, for example, the UE does not support the received extended paging period, and so on. If the UE does not support the received extended paging period, the UE can carry the extended paging period supported by the UE in the rejected negotiation response indication information.

In the embodiment of the present application, the UE sends the negotiation response indication message of rejecting the extended paging period to the MME/SGSN via the NAS signaling.

In step S405, the MME/SGSN selects a certain extended paging period additionally, and it is to proceed to step S401.

In the embodiment of the present application, the MME/SGSN reselects a new extended paging period after receiving the rejected negotiation response indication information from the UE to re-negotiate according to the rejected negotiation response indication information, until the MME/SGSN and the UE reach a consensus negotiation about the extended paging period.

In step S406, the MME/SGSN sends the first extended paging period and the paging indication information which indicates to use the first extended paging period to page to the E-UTRAN/UTRAN.

In step S407, the E-UTRAN/UTRAN sends the first extended paging period in the system information and uses the first extended paging period to send the paging message after receiving the first extended paging period and the paging indication information.

This step is substantially the same as the previous step S306, and is not repeated here.

In step S408, the UE selects the minimum extended paging period from the extended paging period which is requested from the MME/SGSN to be used and the first extended paging period as the second extended paging period, and monitors the paging message according to the selected second extended paging period.

This step is substantially the same as the preceding step S307, and is not repeated here.

Figure 5:
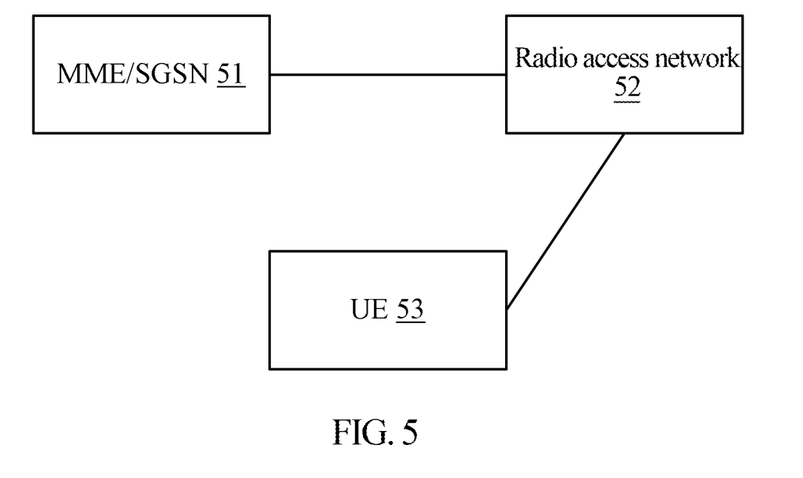
FIG. 5 is a schematic diagram of the configuration of a paging system using the extended paging period in accordance with an embodiment of the present application.

The embodiment of the present application further provides a system using an extended DRX paging period. As shown in FIG. 5, the paging system using the extended paging period in the embodiment of the present application mainly comprises an MME/SGSN 51, a radio access network 52 and a User Equipment (UE) 53.

The MME/SGSN 51 is connected to the radio access network 52, and is configured to negotiate the extended paging period with the User Equipment (UE) 53 to obtain a first extended paging period, send the first extended paging period and paging indication information which indicates to use the first extended paging period to page to the radio access network 52.

In the embodiment of the present application, for example, the UE 53 is configured to send the capability information for indicating that the UE itself supports an extended paging period to the MME/SGSN 51, the MME/SGSN 51 is configured to, select an extended paging period for the UE 53 in local as the first extended paging period according to the capability information after receiving the capability information, whereby the above-mentioned negotiation process is completed.

The radio access network 52 is connected to the MME/SGSN 51 and the UE 53, and is configured to, send the first extended paging period in the system information after receiving the first extended paging period and the paging indication information, and use the first extended paging period to send the paging message.

The UE 53 is connected to the radio access network 52, and is configured to select the second extended paging period according to the extended paging period needed by the UE itself and the first extended paging period, and monitor the paging message according to the second extended paging period.

Wherein, the UE 53 is configured to send a request message which indicates requesting to use an extended paging period supported by the UE itself to the MME/SGSN 51; the MME/SGSN 51 is configured to, judge whether to accept the requested extended paging period according to the subscription information of the UE 53 and the local policy after receiving the request message; take the requested extended paging period as the first extended paging period when accepting the requested extended paging period, otherwise, select an extended paging period in local as the first extended paging period; and is configured to send a negotiation response indication message of accepting or rejecting the requested extended paging period to the UE 53.

Wherein, the UE 53 is configured to send the request message to the MME/SGSN 51 according to an attach request message, a Tracking/Routing Area Update (TAU/RAU) request message or a service request message.

Wherein, the MME/SGSN 51 is configured to select an extended paging period which is shorter than the extended paging period which the UE 53 requests to use in local according to the local policy and the subscription information of the UE 53 as the first extended paging period.

Wherein, the MME/SGSN 51 is configured to send the negotiation response indication information to the UE 53 via a Non-Access Stratum (NAS) signaling.

Wherein, the MME/SGSN 51 is configured to select a certain extended paging period according to the subscription information of the UE 53, Quality of Service (QoS) of the application, and the local policy; send the selected extended paging period to the UE 53; determine the first extended paging period according to the negotiation response indication message; the UE 53 is configured to judge whether to support the certain extended paging period according to the application requirements and its capability of supporting the extended paging period, and when the UE can support the extended paging period send the negotiation response indication message of accepting the extended paging period to the MME/SGSN 51; when the UE cannot support the extended paging period send the negotiation response indication message of rejecting the extended paging period to the MME/SGSN 51.

Wherein, the MME/SGSN 51 is configured to send the selected extended paging period to the UE 53 via Non-Access Stratum (NAS) signaling.

Wherein, the NAS signaling comprises an attach accepted message or a Tracking/Routing Area Update (TAU/RAU) accepted message.

Wherein, the UE 53 is configured to send the negotiation response indication message to the MME/SGSN 51 through the Non-Access Stratum (NAS) signaling.

Wherein, the UE 53 is configured to send a negotiation response indication message of accepting the extended paging period to the MME/SGSN 51, the MME/SGSN 51 is configured to determine the extended paging period as the first extended paging period; the UE 53 is configured to send a negotiation response indication message of rejecting the extended paging period the MME/SGSN 51, the MME/SGSN 51 is configured to determine a certain extended paging period supported by the UE 53 which is carried in the negotiation response indication message of rejecting the extended paging period sent by the UE 53.

Wherein, the MME/SGSN 51 is configured to send the first extended paging period and the paging indication information which indicates to use the first extended paging period to page to the radio access network 52.

Wherein, the SGSN is configured to send the first extended paging period and the paging indication information to the Universal Terrestrial Radio Access Network (UTRAN) 52 via an Iu interface; the MME is configured to send the first extended paging period and the paging indication information to the evolved UTRAN (E-UTRAN) via an S1 interface.

Wherein, the UTRAN comprises the Radio Network Controller (RNC) and a Node B (NodeB), or the RNC and an Evolved Node B (eNodeB); the E-UTRAN comprises an eNodeB.

Wherein, the radio access network 52 is configured to calculate the paging time point according to the first extended paging period and the identity of the UE 53, and send the paging message at the calculated paging time point.

Wherein, the UE 53 is configured to select the minimum extended paging period from the extended paging period which is requested from the MME/SGSN to be used and the first extended paging period as the second extended paging period.

Wherein, the UE 53 is configured to calculate a paging time point according to the second extended paging period and the identity of UE itself, and monitor the paging message at the calculated paging time point.

Wherein, the UE 53 is configured to monitor the paging message for once or more times in active time of a discontinuous reception (DRX) paging period; when the UE 53 is configured to, monitor the paging message for several times within the active time of the DRX paging period, the radio access network 52 is configured to send the paging message for several times in the active time.

Wherein, the UE 53 comprises an MTC apparatus or an intelligent terminal.

In the sleeping time in a long sleeping period, when there is no packet service reaches the UE, the UE enters into a long sleeping period or a longer sleeping period again after this long sleeping period is finished; in the sleeping time of the long sleeping period, when there is uplink packet service, the UE enters into the active mode and sends the packet service, and when there is downlink packet service to reach the UE, the UE is waiting until the sleeping period is finished to receive the packet service; enters into a short sleeping period after sending and receiving the packet service;

the system in the embodiment of the present application is formed by optimizing the processing functions of the network elements therein on the basis of the existing communication network, so the system in the embodiment of the present application can be understood by referring to the structure of the existing communication network, and the functions of the improved related network elements can be understood by referring to the related description of the above-mentioned extended DRX paging period method.

Figure 6:
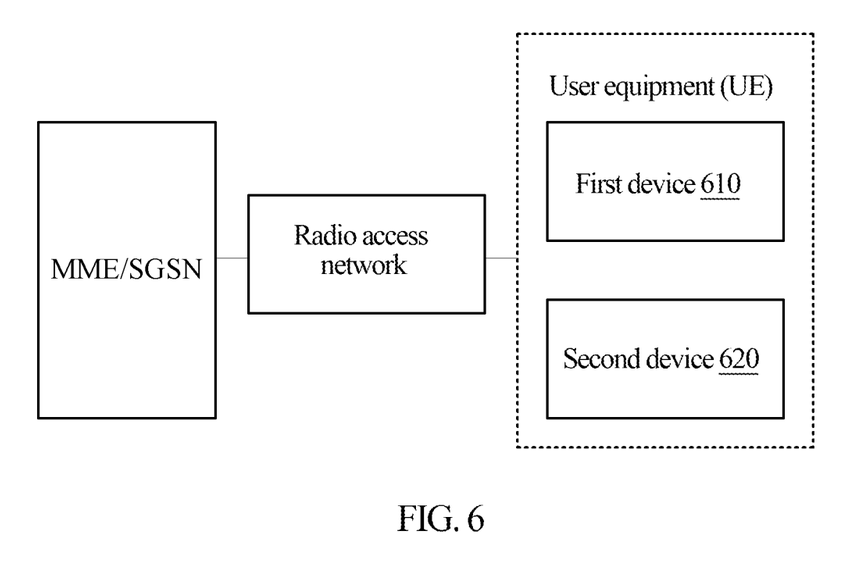
FIG. 6 is a schematic diagram of structure of a user equipment in accordance with an embodiment of the present application.

As shown in FIG. 6, the User Equipment (UE) in the embodiment of the present application mainly comprises that:

a first device 610 is configured to send a request message which indicates requesting to use an extended paging period supported by the UE itself or capability information for indicating that the UE itself supports an extended paging period to the Mobility Management Entity (MME) or Serving GPRS Support Node (SGSN) a, or a first device 610 is configured to send a negotiation response indication message of accepting the extended paging period when the UE can support the extended paging period to the MME/SGSN, and send a negotiation response indication message of rejecting the extended paging period when the UE cannot support the extended paging period to the MME/SGSN;

a second device 620 is configured to receive the negotiation response indication information of accepting or rejecting the requested extended paging period sent by the MME/SGSN, receive the first extended paging period sent by the radio access network in system information and the paging message sent within the first extended paging period, select a second extended paging period according to the extended paging period needed by the UE itself and the first extended paging period and monitor the paging message according to the second extended paging period, or a second device 620 is configured to receive a certain extended paging period sent by the MME/SGSN and the first extended paging period determined and sent by the MME/SGSN according to the negotiation response indication information, to receive the first extended paging period sent by a radio access network in the system information and the paging message sent within the first extended paging period, as well as to select a second extended paging period according to the extended paging period needed by the UE itself and the first extended paging period and monitor the paging message according to the second extended paging period.

The first device 610 is configured to send the request message to the MME/SGSN through an attach request message, a Tracking/Routing Area Update (TAU/RAU) request message or a service request message.

The second device 620 is configured to receive the negotiation response indication information sent by the MME/SGSN via the Non-Access Stratum (NAS) signaling.

The second device 620 is configured to receive the extended paging period sent by the MME/SGSN via the Non-Access Stratum (NAS) signaling.

The first device 610 is configured to send the negotiation response indication message to the MME/SGSN through the Non-Access Stratum (NAS) signaling.

The second device 620 is configured to select a minimum extended paging period from the extended paging period which is requested from the MME/SGSN to be used and the first extended paging period as the second extended paging period.

The second device 620 is configured to calculate a paging time point according to the second extended paging period and an identity of the UE itself, and monitor the paging message at the paging time point calculated by the second device.

The second device 620 is configured to monitor the paging message for once or more times in active time of a discontinuous reception (DRX) paging period; when the second device 620 is configured to, monitor the paging message for several times within the active period of a DRX paging period, the radio access network sends the paging message for several times within the active time.

The embodiments of the present application can effectively reduce the power consumption of the UE, reduce the signaling interaction between the UE and the network side, and achieve the purpose of extending the DRX paging period.

A person skilled in the art should understand that respective components of the device and/or system provided in the embodiments of the present application, as well as the respective steps in the method, can be concentrated on a single computing device or distributed in a network consisting of multiple computing devices. Alternatively, the device, system and method in the embodiments of the present application may be implemented by program codes executable by computing devices, therefore can be stored in storage device and executed by computing devices, or made into individual integrated circuit modules, or some of the modules or steps therein can be made into a single integrated circuit module to implement. Therefore, the embodiment of the present application is not limited to the combination of any specific hardware and software.

Although the embodiments of the present document are disclosed as above, but the content is only embodiments used to facilitate understanding the present document, and is not intended to limit the present document. Any skilled in the art of the present document can make any modifications and changes in forms and details of the implementation on the premise of without departing from the spirit and scope disclosed in the present document, but the protection scope of the present document is still the range defined by the appended claims.

INDUSTRIAL APPLICABILITY

Compared with the related art, the embodiment of the present application enables a UE in the idle mode to achieve the effect of energy saving by using the extended paging period. In the embodiments of the present application, when the MME/SGSN at the network side uses the extended DRX paging period, the E-UTRAN/UTRAN uses the extended paging period, and the target UE also selects the extended paging period to monitor the paging message. The embodiment of the present application enables the extended paging period to achieve the proper meaning thereof, thereby reducing the power consumption of the target UE, extending the life of a power supply unit such as the battery, and having the advantages of energy-saving and environmental protection. Therefore, the present document has very strong industrial applicability.

What is claimed is:

1. A method of using an extended paging period to page, comprising:
a Mobility Management Entity (MME) or a serving General Packet Radio Service (GPRS) Support Node (SGSN) negotiating an extended paging period with a User Equipment (UE) to obtain a first extended paging period;
the MME/SGSN sending the first extended paging period and paging indication information which indicates to use the first extended paging period to page to a radio access network;
after receiving the first extended paging period and the paging indication information, the radio access network sending the first extended paging period in system information and using the first extended paging period to send a paging message;
the UE selecting a minimum extended paging period from an extended paging period needed by the UE itself and the first extended paging period as a second extended paging period, and monitoring the paging message according to the second extended paging period.

2. The method of claim 1, wherein, the step of an MME/SGSN negotiating an extended paging period with a UE to obtain a first extended paging period comprises:
the UE sending a request message which indicates requesting to use a certain extended paging period supported by the UE itself to the MME/SGSN;
the MME/SGSN judging whether to accept the requested extended paging period according to subscription information of the UE and a local policy after receiving the request message;
the MME/SGSN taking the requested extended paging period as the first extended paging period when accepting the requested extended paging period, otherwise, selecting an extended paging period in local as the first extended paging period;
the MME/SGSN sending a negotiation response indication message of accepting or rejecting the requested extended paging period to the UE.

3. The method of claim 2, wherein, the step of the UE sending a request message which indicates requesting to use a certain extended paging period supported by the UE itself to the MME/SGSN comprises: the UE sending the request message to the MME/SGSN according to an attach request message, a Tracking/Routing Area Update (TAU/RAU) message or a service request message,
or,
wherein, the step of the MME/SGSN selecting an extended paging period in local as the first extended paging period comprises:
the MME/SGSN selecting an extended paging period which is shorter than the extended paging period that the UE requests to use in local according to the local policy and the subscription information of the UE as the first extended paging period,
or,
wherein, the step of the MME/SGSN sending a negotiation response indication message of accepting or rejecting the requested extended paging period to the UE comprises:
the MME/SGSN sending the negotiation response indication message to the UE via Non-Access Stratum (NAS) signaling.

4. The method of claim 1, wherein, the step of an MME/SGSN negotiating an extended paging period with a UE to obtain a first extended paging period comprises:
the UE sending capability information for indicating that the UE itself supports an extended paging period to the MME/SGSN;
the MME/SGSN selecting an extended paging period for the UE in local as the first extended paging period according to the capability information after receiving the capability information.

5. The method of claim 4, wherein, the step of the MME/SGSN sending the selected certain extended paging period to the UE comprises:
the MME/SGSN sending the selected certain extended paging period to the UE via Non-Access Stratum (NAS) signaling,
or,
wherein, the step of the UE sending a negotiation response indication message of accepting or rejecting the certain extended paging period to the MME/SGSN comprises:
the UE sending the negotiation response indication message to the MME/SGSN through Non-Access Stratum (NAS) signaling,
or,
wherein, the step of the MME/SGSN determining the first extended paging period according to the negotiation response indication message comprises:
when the UE sends the negotiation response indication message of accepting the certain extended paging period to the MME/SGSN, the MME/SGSN determining the certain extended paging period as the first extended paging period;
when the UE sends the negotiation response indication message of rejecting the certain extended paging period to the MME/SGSN, the MME/SGSN determining a certain extended paging period supported by the UE which is carried in the negotiation response indication message of rejecting the certain extended paging period sent by the UE as the first extended paging period.

6. The method of claim 5, wherein,
the NAS signaling comprises an attach accepted message or a Tracking/Routing Area Update (TAU/RAU) accepted message.

7. The method of claim 1, wherein, the step of an MME/SGSN negotiating an extended paging period with a UE to obtain a first extended paging period comprises:
the MME/SGSN selecting a certain extended paging period according to the subscription information of the UE, Quality of Service (QoS) of application, and the local policy;
the MME/SGSN sending the selected certain extended paging period to the UE;
the UE judging whether the UE can support the certain extended paging period according to application requirements and the capability of the UE itself supporting an extended paging period;
when the UE can support the certain extended paging period, the UE sending a negotiation response indication message of accepting the certain extended paging period to the MME/SGSN; when the UE cannot support the certain extended paging period, the UE sending a negotiation response indication message of rejecting the certain extended paging period to the MME/SGSN;
the MME/SGSN determining the first extended paging period according to the negotiation response indication message.

8. The method of claim 1, wherein, the step of the MME/SGSN sending the first extended paging period and paging indication information which indicates to use the first extended paging period to page to a radio access network comprises:
the MME/SGSN sending the first extended paging period and the paging indication information to the radio access network via a paging message.

9. The method of claim 1, wherein, the step of the MME/SGSN sending the first extended paging period and paging indication information which indicates to use the first extended paging period to page to a radio access network comprises:
the SGSN sending the first extended paging period and the paging indication information to a Universal Terrestrial Radio Access Network (UTRAN) via an Iu interface;
the MME sending the first extended paging period and the paging indication information to an evolved UTRAN (E-UTRAN) via an S1 interface.

10. The method of claim 9, wherein,
the UTRAN comprises a Radio Network Controller (RNC) and a Node B (NodeB), or the RNC and an Evolved Node B (eNodeB);
the E-UTRAN comprises an eNodeB.

11. The method of claim 1, wherein, the step of the radio access network sending the first extended paging period in system information and using the first extended paging period to send a paging message comprises:
the radio access network calculating a paging time point according to the first extended paging period and an identity of the UE, and sending the paging message at the calculated paging time point.

12. The method of claim 1, wherein, the step of the UE selecting a minimum extended paging period from an extended paging period needed by the UE itself and the first extended paging period as a second extended paging period comprises:
the UE selecting a minimum extended paging period from the extended paging period which is requested from the MME/SGSN to be used and the first extended paging period as the second extended paging period.

13. The method of claim 1, wherein, the step of the UE selecting a minimum extended paging period from an extended paging period needed by the UE itself and the first extended paging period as a second extended paging period comprises:
the UE calculating a paging time point according to the second extended paging period and the identity of the UE itself, and monitoring the paging message at the calculated paging time point.

14. The method of claim 1, wherein, the step of the UE selecting a minimum extended paging period from an extended paging period needed by the UE itself and the first extended paging period as a second extended paging period comprises:
the UE monitoring the paging message for once or more times in an active time of a Discontinuous Reception (DRX) paging period;
when the UE monitors the paging message for several times in the active time of the DRX paging period, the radio access network sending the paging message for several times in the active time.

15. An User Equipment (UE), comprising a processor, and a storage device for storing computer executable instructions that when executed by the processor cause the processor to perform the steps in following devices:
a first device is configured to: send a request message which indicates requesting to use a certain extended paging period supported by the UE itself or capability information for indicating that the UE itself supports an extended paging period to a Mobility Management Entity (MME) or serving General Packet Radio Service (GPRS) support node (SGSN); or send a negotiation response indication message of accepting the certain extended paging period when the UE can support the certain extended paging period to the MME/SGSN, and send a negotiation response indication message of rejecting the certain extended paging period when the UE cannot support the certain extended paging period to the MME/SGSN;

a second device is configured to: receive the negotiation response indication message of accepting or rejecting the requested extended paging period sent by the MME/SGSN, receive a first extended paging period sent by a radio access network in system information and a paging message sent with the first extended paging period, select a second extended paging period according to an extended paging period needed by the UE itself and the first extended paging period and monitor the paging message according to the second extended paging period;

or receive a certain extended paging period sent by the MME/SGSN and the first extended paging period determined and sent by the MME/SGSN according to the negotiation response indication message, receive a first extended paging period sent by the radio access network in system information and paging message sent with the first extended paging period, and select a minimum extended paging period from an extended paging period needed by the UE itself and the first extended paging period as a second extended paging period and monitor the paging message according to the second extended paging period.

16. The user equipment of claim 15, wherein:

the first device is configured to send the request message to the MME/SGSN through an attach request message, a Tracking/Routing Area Update request message (TAU/RAU) or a service request message, or, wherein the second device is configured to receive the negotiation response indication message sent by the MME/SGSN via Non-Access Stratum (NAS) signaling, or, wherein the second device is configured to receive the certain extended paging period sent by the MME/SGSN through Non-Access Stratum (NAS) signaling, or, wherein the first device is configured to send the negotiation response indication message to the MME/SGSN through Non-Access Stratum (NAS) signaling, or, wherein the second device is configured to select a minimum extended paging period from the extended paging period which is requested from the MME/SGSN to be used and the first extended paging period as the second extended paging period.

17. The user equipment of claim 15, wherein:

the second device is configured to calculate a paging time point according to the second extended paging period and an identity of the UE itself, and monitor the paging message at the paging time point calculated by the second device.

18. The user equipment of claim 17, wherein:

the second device is configured to monitor the paging message for once or more times in an active time of a discontinuous reception (DRX) paging period; when the second device is configured to monitor the paging message for several times in the active period of the DRX paging period, the radio access network sends the paging message for several times in the active time.

19. A system of using an extended paging period to page, comprising:

a Mobility Management Entity (MME) or Serving General Packet Radio Service (GPRS) Support Node (SGSN), which is configured to negotiate an extended paging period with a User Equipment (UE) to obtain a first extended paging period, send the first extended paging period and paging indication information which indicates to use the first extended paging period to page to a radio access network;

the radio access network is configured to, after receiving the first extended paging period and the paging indication information, send the first extended paging period in system information and use the first extended paging period to send a paging message;

the UE is configured to select a minimum extended paging period from an extended paging period needed by the UE itself and the first extended paging period as a second extended paging period, and monitor the paging message according to the second extended paging period.

20. The system of claim 19, wherein:

the radio access network comprises a Radio Network Controller (RNC) and a Node B (NodeB), or comprises the RNC and an Evolved Node B (eNodeB), or comprises an eNodeB, or, wherein, the UE comprises a Machine Type Communication (MTC) apparatus or an intelligent terminal.

* * * * *